Figure 1:
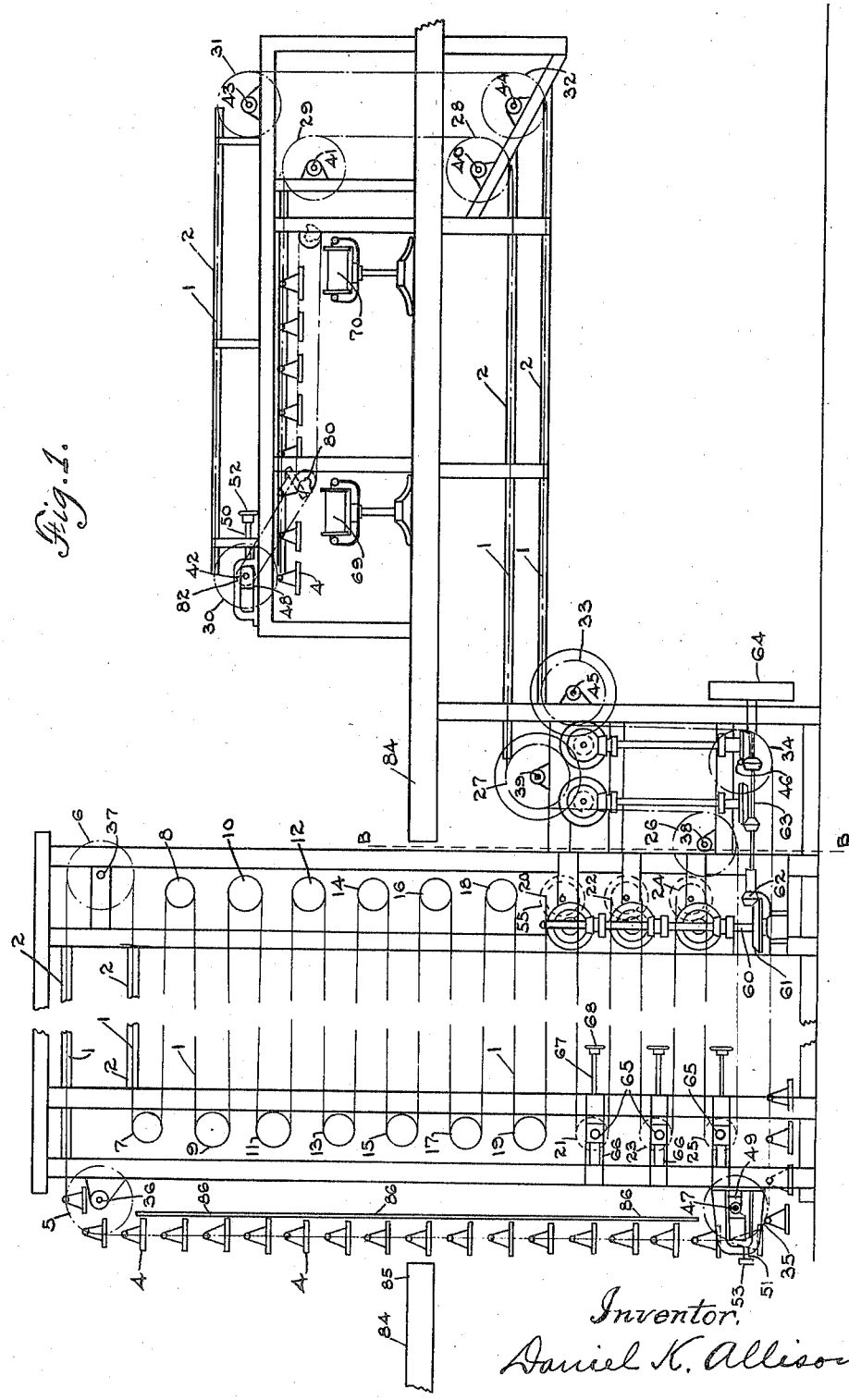

D. K. ALLISON.
MACHINE FOR COOLING BREAD.
APPLICATION FILED JUNE 28, 1918.

1,312,294.

Patented Aug. 5, 1919.
2 SHEETS—SHEET 1.

Inventor,
Daniel K. Allison

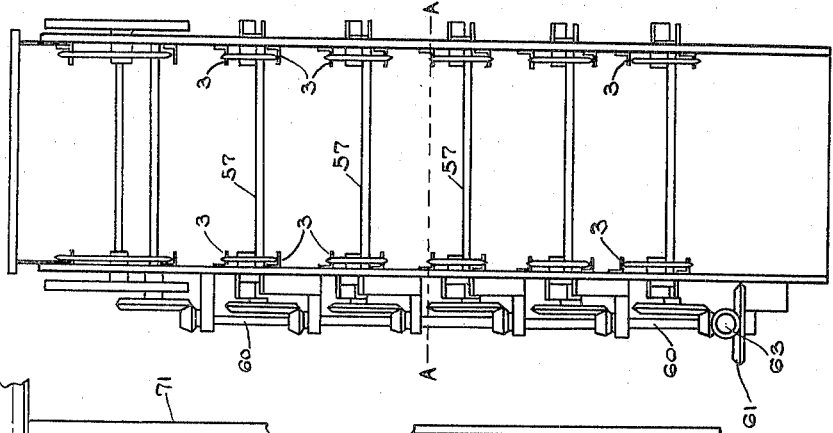
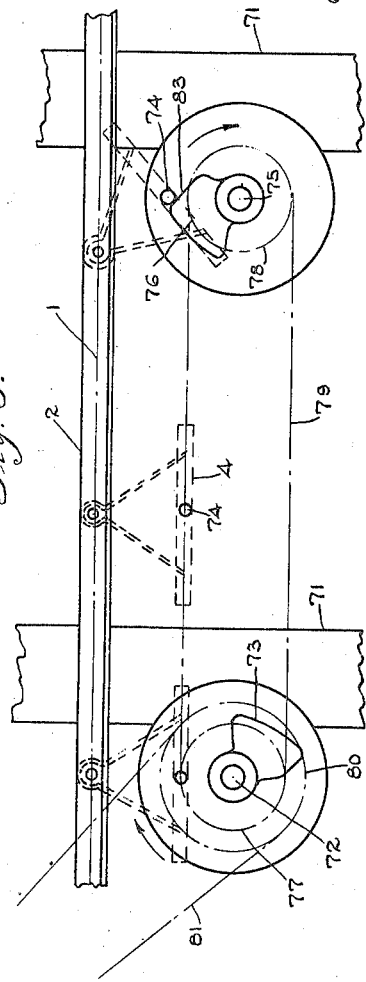
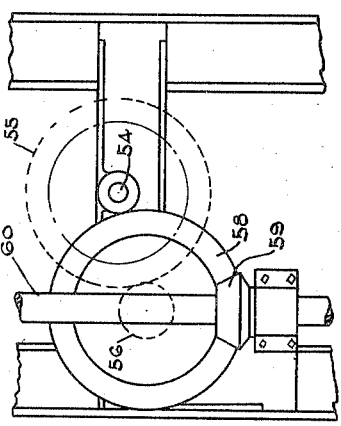
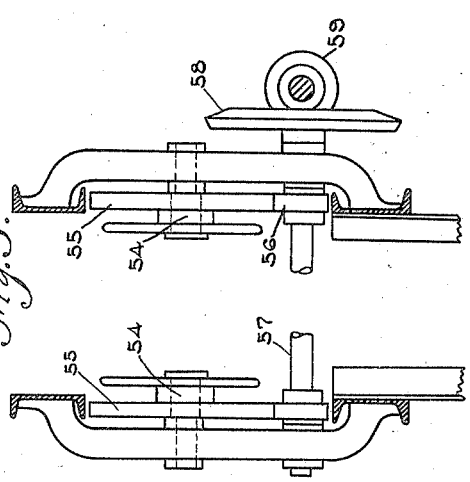

UNITED STATES PATENT OFFICE.

DANIEL K. ALLISON, OF CINCINNATI, OHIO, ASSIGNOR TO THE J. H. DAY COMPANY, OF CINCINNATI, OHIO, A CORPORATION OF OHIO.

MACHINE FOR COOLING BREAD.

1,312,294.  Specification of Letters Patent.  Patented Aug. 5, 1919.

Original application filed November 26, 1917, Serial No. 203,925. Divided and this application filed June 28, 1918. Serial No. 242,487.

*To all whom it may concern:*

Be it known that I, DANIEL K. ALLISON, a citizen of the United States, residing at Cincinnati, in the county of Hamilton and State of Ohio, have invented a certain new and useful Improvement in Machines for Cooling Bread, of which the following is a specification.

My invention relates to machines for receiving hot bread directly after its removal from the oven and for conveying it to and fro during a certain interval of time sufficient to effect the cooling of the bread; and its object is to convey the hot loaves of bread through a series of flights or elevations beginning at the top and ending at the bottom and afterward to convey the bread to a remote point where it may be discharged onto two side conveyers alternately, so as to supply bread in equal quantities to two separate bread wrapping machines. Other objects I may attain by the mechanisms disclosed which will be more particularly pointed out hereinafter.

This application is a division of my application filed November 26, 1917, Serial No. 203,925.

My invention is illustrated in the accompanying drawings in which Figure 1 represents an elevation of my invention; Fig. 2 represents an end view of my invention; Fig. 3 is a horizontal section through Fig. 2 on the line A—A; Fig. 4 is a partial elevation of the parts shown in Fig. 3; Fig. 5 illustrates the unloading mechanism. 1—1 represents a pair of endless conveyer chains, traveling in unison, one on each side of the machine. These chains are supported by angle irons 2, secured to the frame of the machine. These angle irons form ledges 3 upon which the conveyer chains travel. The conveyer chains carry pans 4 which are suspended from the chains, so that the flat surfaces of the pans remain horizontally throughout their circuit in the machine. These pans are spaced as close together as is practicable so as to provide for the greatest capacity possible. The conveyer chains 1—1 travel in succession over sprocket wheels 5—6—7—8—9—10—11—12—13—14— 15—16—17—18—19—20—21—22—23—24— 25—26—27—28—29—30— and return over sprockets 31—32—33—34 and 35 to the starting point. Sprockets 5—6—26—27— 28—29—30—31—32—33—34 and 35 are respectively mounted upon transverse shafts 36—37—38—39—40—41—42—43—44—45— 46 and 47 which said shafts are rotatably mounted in suitable bearings fixed to the frame of the machine. Shafts 42 and 47 are capable of horizontal adjustment, being mounted in bearings 48 and 49 respectively and being adjustable by the screws 50 and 51 and hand wheels 52 and 53. The sprocket wheels 7 to 25 inclusive are mounted on studs 54 shown in Figs. 3 and 4. Sprockets 8—10—12—14—16—18—20—22 and 24 are drive sprockets and to the hubs of these sprockets are secured the gear wheels 55, the gears and sprockets being rotatably mounted upon the studs 54. Gear wheels 55 are driven by the pinions 56 which are keyed to shafts 57. On the ends of shafts 57 are keyed bevel gears 58 which are driven by bevel pinions 59. The pinions 59 are all keyed to the vertical shaft 60, which receives its power through the bevel gear 61 and pinion 62 and horizontal shaft 63 from the pulley 64. In order to keep the conveyer chains taut the bearings 65 are capable of longitudinal adjustment in the brackets 66 by means of the screws 67 and hand wheels 68.

The dumping arrangement for my machine is shown enlarged in Fig. 5. When a baker has two wrapping machines it is desirable to distribute the bread to the two machines in equal quantities and on that account two lateral conveyers 69 and 70 are used, one carrying the bread to each machine.

71 represents a portion of the frame of the machine shown in Fig. 5. A shaft 72 extends cross-wise of the machine and is rotatably supported in any suitable bearings. Keyed to this shaft is a cam 73. This cam is arranged to travel in the path of the studs 74 of the pans 4. A shaft 75 also extends cross-wise of the machine and is rotatably supported in any suitable bearings. Keyed to this shaft 75 is the cam 76. To shafts 72 and 75 are keyed suitable drive sprocket wheels 77 and 78. These sprocket wheels are connected by a drive chain 79. Sprocket wheel 80 is also keyed to shaft 72 and is driven by chain 81 which passes around sprocket wheel 82 keyed to shaft 42. By this means power is transmitted from the conveyer chains 1 through shaft 42 to shafts 72 and 75.

It will be noted that cams 73 and 76 are arranged on opposite sides of their shaft centers. This arrangement permits the two cams to trip the pans alternately. In Fig. 5 the cam 76 is shown in the act of tripping a pan. The stud 74 of the pan is here arrested by the edge 83 of the cam 76. The cams rotate in direction indicated by the arrows. It will be noted that the engaging edge of the cams move in the opposite direction to the travel of the pans and after the studs 74 pass over the high points of the cams the pans will begin to drop to a horizontal position; but since the cam edges 83 will still engage the studs 74 they prevent sudden swinging of the pan and enable the pan to come to a horizontal position gradually. It will not be noted that the cam 76 will not trip every pan but rather every other pan; and the cam 73 will trip the pans which the cam 76 omits to trip. The operation of the cam 73 is similar to that of the cam 76.

In Fig. 1 I have shown the conveyer chains extending beyond the main frame of the machine. I have shown the main frame of the machine in Fig. 1 cut vertically and arranged to occupy less space on the drawing, in order to fully illustrate the extension.

In Fig. 1 the machine is shown extending through the floor 84 and when loading the machine a man should stand at the point marked 85 within easy reach of the pans. Behind the ascending pans the backing bar 86 is fixed to prevent the pans from swinging while being loaded.

The operation of the machine is as follows:

Power is applied to the pulley 64 by means of a belt. When the conveyer chains are moving at the proper speed, hot bread is placed upon the pans 4 and is first conveyed to the top of the machine and thence horizontally through the entire length of the machine and thence dropped to a lower elevation and returned to the opposite end of the machine and this process is continued until the bread has reached its discharge point, where it is unloaded onto the cross conveyers 69 or 70 by the tipping of the pans.

I claim—

1. In a bread cooling machine comprising an endless conveyer and a plurality of pans suspended therefrom, a pan tipping mechanism consisting of a pair of cams arranged so that when one is engaging a pan the other is out of engagement and means controlling the movement of the cams to cause them to tip the pans alternately and successively.

2. In a bread cooling machine comprising an endless conveyer and a plurality of pans suspended therefrom, a pan tipping mechanism consisting of a pair of cams located with their engaging surfaces in alinement with pan tipping elements and in diametrically opposite positions and means for controlling the united operation of the cams arranged to cause them to tip the pans alternately and successively.

3. In a bread cooling machine comprising an endless conveyer and a plurality of pans suspended therefrom, a pan tipping mechanism consisting of a pair of cams mounted on shafts and located with their engaging surfaces in alinement with pan tipping elements, means controlling the movement of the cams arranged to cause the cams to tip the pans alternately and successively, together with means for driving said cams.

4. In a bread cooling machine comprising an endless conveyer and a plurality of pans suspended therefrom a pan tipping mechanism consisting of a pair of shafts rotating at uniform velocity and a pair of cams mounted on said shafts and located with their engaging surfaces in alinement with pan tipping lugs and in diametrically opposite positions and driving means connecting the cams.

5. In a bread cooling machine comprising an endless conveyer and a plurality of pans suspended therefrom, a pan tipping mechanism consisting of a pair of rotating cams mounted upon separate shafts and having their engaging surfaces diametrically opposite and arranged to engage the pans alternately and successively, a chain belt connecting the two shafts to hold the cams in register with the pans and positive driving means for propelling the pan tipping mechanism in unison with the conveyer.

DANIEL K. ALLISON.

Witnesses:
  THEO. L. HOFFMAN,
  H. C. BRUNST.

Copies of this patent may be obtained for five cents each, by addressing the "Commissioner of Patents, Washington, D. C."